Patented Apr. 7, 1942

2,278,486

UNITED STATES PATENT OFFICE 2,278,486

CELLULAR REFRACTORY

Wirt S. Quigley and Jay Gould Coutant, New York, N. Y., assignors to Quigley Company, Inc., New York, N. Y., a corporation of New York No Drawing. Application September 26, 1936, Serial No. 102,816

2 Claims. (Cl. 106—64)

This invention relates to cellular refractories, having reference both to the process of manufacture and to the products, whether in the nature of bricks, slabs or other blocks, or powdered or plastic material for forming linings, as for furnaces, kilns, etc., the cellular or porous construction affording lightness and heat-insulating-refractory properties, and the materials and mode of construction affording a refractory product capable of withstanding the high temperatures.

We are aware that it has heretofore been proposed to produce cellular refractories in the following way. With finely divided fireclay is combined, while both are dry, shredded or macerated newspaper blown through an 8-mesh screen; by volume clay about 1 part, paper 2½ parts, or by weight clay 2 and paper 1 part. These are mixed thoroughly and then wetted and rendered plastic by addition of minimum water, which swells the fibers. After working or kneading, the stiff mix is molded under light pressure, for example as blocks of standard brick size. The molded bricks are next dried, and then burned in a kiln, first at 1100° F. for 24 hours, supplying excess air to burn the paper, which helps maintain a high temperature, and then at 2400° for 48 hours without air. The burning of the carbon fibers and the steaming of the water therein, forms numerous tiny cells of various shapes, throughout the product, affording lightness with relative strength, and insulating property. The bricks are refractory, to withstand perhaps 2500° under load of 8 lbs. to the square inch, and they can be machined to shape. The waste material can be crushed into a grog or aggregate available for manufacture of firebrick, for example, by adding to the mix above described.

A modification of such prior method has also been proposed wherein about 1 volume of fused alumina $Al_2O_3$, ground to pass 120 mesh, is first mixed with 2 volumes of fireclay and this mixture combined dry with about 7½ volumes of shredded newspaper, followed by restricted wetting for plasticity, molding and drying. Upon burning at about 2400° the mineral ingredients are believed to combine to form some mullite $3Al_2O_3.2SiO_2$, or its equivalent, having stability at high temperatures. The product is slightly heavier and more heat conductive than the first disclosure, but will carry the same load at higher temperatures.

The main object of the present invention is to improve generally and specifically the methods of the prior art as thus recited, and the insulating-refractory properties of the blocks, linings or other products thereof. A particular object is to render the former methods more suitable to commercial practise by changes in the raw materials used and the method steps, and by means of supplemental agents, treatments and steps, thereby to improve the properties of the furnace wall blocks or other products. Further objects and advantages will appear in the hereinafter following specification.

First will be described processes embodying the present invention and the products thereof, and the novel features thereof will be set forth in the appended claims. In an illustrative process the steps may be as follows:

(a) A cheap, fibrous, carbonaceous material, such as digested wood pulp or waste paper, is disintegrated or ground dry into a very fine condition, and is sized to less than ⅛ inch to eliminate coarser pieces, the result being a fluffy collection of shreds and particles down to microscopic size; for which waste newspaper may be used as in said prior methods proposed.

(b) A special clay is selected which is amorphous, very cohesive and plastic, and preferably free of fluxes, especially acid fluxes. Certain kaolin fireclays or blends thereof, such as low-flux high-porosity New Jersey clays will serve, these changing pyrochemically by forming mullite and silica, which change improves resistance to high temperatures.

(c) The clay is dried under heat, as in a rotary drier or kiln, and tumbled or reduced to substantially colloidal fineness, which is practical with the clays mentioned.

(d) A thorough mixture is now made, dry, of about ½ to 1 part by weight of the carbonaceous ingredient (a) with 2 parts of the reduced clay (c), as by a mechanical mixing machine.

(e) Water is added, during or after the mixing, not in minimum proportion as in the prior methods, but in sufficient excess to afford a quite wet or substantially sloppy consistency of mix, which is very desirable; and mechanical mixing may be continued in the wet stage for more complete distribution of the carbonaceous or combustible particles and fibers throughout the mass.

(f) A special mold is prepared, with compartments for one or preferably several blocks, its walls or some of them composed of highly absorbent material or slabs, as of plaster of Paris, which after use may be dried out again for reuse. The mold cavity may be somewhat oversize to allow for shrinkage or in case the block is to be later trimmed to size or shape.

(g) The wet mix (e) is placed in the mold, without subjection to substantial pressure, and the absorbent walls extract rapidly the excess water sufficiently to render firm the block and permit its removal and handling. A plaster of Paris slab may be the top to the mold, and its weight presses the block being molded; it absorbs water and increases in weight and can descend in the mold. This tends to strengthen the product. The mold may sometimes be of final size, requiring no subsequent trimming. It can be inverted after filling, so applying its weight to assist the deliquidizing and shaping of the product. Without a deliquidizing step at this stage the process would not be economically practical on account of the unduly long period of time requisite for natural drying; and heat and pressure being undesirable at the molding stage.

(h) The deliquidized block, resting on a suitable carrier and preferably removed from the mold, is next over-dried for several days until sufficiently hard or rigid to be stacked. The oven may be fired to a temperature of 300–400° more or less.

(i) The block is next treated in a kiln first to dry it completely and then to burn it, like pottery, at a high temperature, as 2400° more or less. The temperature should be raised gradually through the drying stage to the burning temperature. After 2 days more or less, of burning, a chemical change will be found to have occurred, the fireclay having been converted partly to crystalline mullite and with an excess of free silica. At the same time the multitude of tiny combustible or carbon particles and fibers have become incinerated and gasified to form a myriad of minute cells of non-uniform shapes, some long, some short, some flat, some irregular, each surrounded by walls of porous clay material. The firing thus renders porous the mix before the indurating or hardening is completed. There results a cellular insulating refractory structure, of excellent strength to resist compression and flexure, and with minimum wastage in production. Good binding power is afforded by the interlocking of the mullite crystals and other constituents, giving strength. Shrinkage is minimized.

(j) After sawing, grinding or otherwise machining the block, for example to standard brick size, it is complete, and may be built into a furnace or kiln wall and exposed directly to the fire, for example it may withstand 2600°. Its weight may be as low as 2 lbs. as compared with 7 lbs. or heavier for standard firebrick, and with 2 lbs. 2 oz. or 3 lbs. 4 oz. for the respective cellular bricks heretofore proposed.

(k) Supplementally, the grindings and trimmings and any broken blocks, as waste material, may be crushed or re-ground and reduced to a very fine condition, for example to pass a 150-mesh screen, and utilized to advantage. This powdered and pre-shrunk byproduct constitutes a valuable fine aggregate of porous particles of wide utility. It may be employed as an aggregate for lagging material, or for insulating refractory concrete, or as a non-shrinking grog for the making of either burned or unburned brick. Or it may be used as an insulating refractory filler between the hot face portion and the cool outer shell of a furnace wall.

(l) For example, the pulverized material or grog (k), cellular or porous and refractory, may be combined with other materials to form furnace linings or blocks. The material may be mixed with aluminum powder, preferably below 1% by weight, with perhaps some filamentary asbestos added. By now adding a suitable hydraulic cement, for example containing calcium as in the form of calcium aluminate cement, a preparation or mixture results adapted to various insulating-refractory uses, and which may be marketed as such, or with the cement omitted and to be added at will. In this and other examples stated below the addition of aluminum powder uses up water and so reduces dampness and tends to prevent deterioration during storage and shipment.

(m) The mixed material or preparation (l) may have water added in quantity to produce a concrete mix of pasty consistency, and it may then be plastered or otherwise placed upon a furnace wall or other surface to be coated, for example in a 1 in thick layer. By chemical action the aluminum powder causes the production of gas bubbles with expansion of mix, forming small cells, the volume materially increasing, for example up to 40% or more, thus affording an effective insulating coating, refractory to 2500° more or less.

(n) Or, the preparation (l) may be wetted and molded into blocks and allowed to expand and set, and may be later trimmed, or before setting may be compressed back to size and shape. Such blocks may be shrunk by burning and marketed thus, or may be sold in set condition as insulating-refractories, to become burned only after being placed in use.

(o) Another preparation may be made by combining the powdered cellular and refractory material (k) with fireclay, Portland cement, and aluminum powder in mixture. This is adapted to various insulating-refractory uses and may be marketed with or without the cement.

(p) Or, preparation (o) may be wetted and molded into blocks, allowed to expand and set and then trimmed, or when partly set after expansion compressed down to size and shape; such blocks then dried and sold thus, or first burned.

(q) One modification of the process (a) to (j) is at step (b) to select a fine fireclay containing an alkaline agent or flux, or to add such an agent to the clay; and before step (d) to add metallic aluminum in fine condition; so that, after adding water an expanding reaction occurs between the alkaline agent, the metal powder and the water, releasing hydrogen, which forms numerous round cells in addition to the mixture of long and irregular cells or pores already described, and thus greatly increases the porosity of the product, proportionately reducing its weight and conductivity, without a corresponding reduction of strength. This may be described as a cellular product the walls of the cells of which are microscopically porous. Such a standard brick may weigh as low as 1 lb. 8 oz. It need not be made oversize, but slight over-expansion may be repressed at the top face, by downward compression before completion of setting, thus strengthening the product, by densifying its top surface.

(r) Another modification is to add before step (d) a small proportion of crystalline fused alumina or corundum ground to pass about a 150 mesh screen. The presence of this ingredient in the final block adds to its refractoriness so that it may sustain its load up to about 3000°. Its fineness of condition affords the surface area necessary for strong bonding with the mullite.

(s) At steps (m) (n) and (o) the addition of aluminum powder increases refractoriness, and in the case of added fused alumina or ground corundum, adds super-refractoriness, in the manner of gelatinous alumina which in the presence of an alkali gives trihydrate crystals identical with gibbsite ($Al_2O_3.3H_2O$). So aluminum powder when combined with water in the presence of an alkali gives crystals similar to diaspore ($Al_2O_3.H_2O$), in which the water is 15%, while in gibbsite it is 35% and in bauxite it is 26%, the diaspore being a superior refractory on account of the lesser contraction due to the smaller percentage of water.

(t) The powdered material or grog (k) may be variously used to make furnace linings or blocks; e. g. by combining with dry gelatinous alumina and a hydraulic cement, marketable as a dry mixture. Material (k) or (t) may be mixed with aluminum powder and sold with or without a binder containing an alkali, the complete mixture when wetted adapted to form an insulating-refractory block or lining, with expansion and setting, and with or without trimming or repression to size and shape.

(u) An effective block or lining, insulating and refractory, is composed of any refractory cellular mineral material, grog or clay, mixed with aluminum powder and a hydraulic or Portland cement, expanded upon the addition of water into a cellular condition and allowed to set.

Thus, by cheap raw materials and economic processes, are produced cellular refractory materials light in weight, yet strong in relation to weight, so as to support a much higher wall than can firebrick against crushing under its own weight, and of high refractory character. In furnace operation efficiency is increased by the light weight and low heat storage capacity and by the high heat insulation property of the products, minimizing heat storage and both conduction and radiation losses; thus rendering negligible the delays and operative losses in fluctuating combustion conditions and starting and stopping operations.

While several instances have been illustratively described it is to be understood that the ingredients may be altered and their proportions may be varied, within the disclosure, as much as 50% above or below the stated amounts or percentages, so that the described results are secured; and likewise temperatures, periods and other factors may be reasonably varied within the skill of one conversant with the art.

To the extent that the hereinabove disclosures of various embodiments of the present invention include specific suggestions of using certain wetted expansible and settable mixtures for the lagging of hot surfaces such as furnace walls and suggestions for the addition to certain mixtures of fiber asbestos or of fireclay, such suggested features of subject-matter, although comprehended generally in the breadth of the present invention, are hereby declared per se to have been derived from the applicant of the copending application, with common assignee, of E. Waugh, Serial No. 237,471.

We claim:

1. A stable and high-insulating and refractory block, layer or other product, composed of an expanded and set mixture containing a fine aggregate of the order of 150-mesh of indurated fireclay particles and a hydraulic mement, and free of any coarse aggregate; said product having a structure containing relatively large gas-filled globular cells of visible size separated by relatively thin refractory walls, and said thin separating walls being composed of said fireclay particles and cement and being highly porous by reason of said indurated fireclay particles containing minute voids of microscopic character; whereby to constitute an insulating product of very light weight adapted to withstand continued exposure to furnace temperatures.

2. A stable and high-insulating and refractory block, layer or other product, composed of an expanded and set mixture containing a fine aggregate in the condition of a finely powdered grog of indurated fireclay particles and a hydraulic cement, and free of any coarse aggregate; said product having a structure containing relatively large gas-filled globular cells of visible size separated by relatively thin refractory walls, and said thin separating walls being composed of said fireclay particles and cement and being highly porous by reason of said indurated fireclay particles containing minute voids of microscopic character; whereby to constitute an insulating product of very light weight adapted to withstand continued exposure to furnace temperatures.

WIRT S. QUIGLEY.
JAY GOULD COUTANT.